United States Patent
Itoh

(10) Patent No.: US 6,740,442 B1
(45) Date of Patent: May 25, 2004

(54) UNIT CELL OF FLAT SOLID OXIDE FUEL CELL AND FUEL CELL STACK COMPRISING THE SAME

(75) Inventor: Hibiki Itoh, Kanagawa (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 09/979,822

(22) PCT Filed: May 31, 1999

(86) PCT No.: PCT/JP99/02897

§ 371 (c)(1),
(2), (4) Date: Nov. 26, 2001

(87) PCT Pub. No.: WO00/74159

PCT Pub. Date: Dec. 7, 2000

(51) Int. Cl.[7] ................................................ H01M 8/10
(52) U.S. Cl. .......................................... 429/32; 429/30
(58) Field of Search ..................... 429/30, 32

(56) References Cited

U.S. PATENT DOCUMENTS

| | | | |
|---|---|---|---|
| 4,476,196 A | * 10/1984 | Poeppel et al. | 429/32 |
| 4,874,678 A | * 10/1989 | Reichner | 429/30 |
| 5,185,219 A | * 2/1993 | Ishihara et al. | 429/31 |
| 5,589,286 A | * 12/1996 | Iwata | 429/34 |
| 6,045,935 A | * 4/2000 | Ketcham et al. | 429/30 |

FOREIGN PATENT DOCUMENTS

| | | |
|---|---|---|
| JP | 4-149024 | 5/1992 |
| JP | 8-306361 | 11/1996 |
| JP | 09-505684 | 6/1997 |
| WO | 95/07554 | 3/1995 |

OTHER PUBLICATIONS

Morgan Advanced Ceramics Datasheet for Glass Ceramic [online], [retrieved on Mar. 23, 2003]. Retrieved from the Internet <URL: http://www.morganadvancedceramics.com/materials/gc.htm>.*

Translation of PCT International Preliminary Examination Report, dated Aug. 14, 2000. For PCT/JP99/02897.

"Fabrication of Stabilized Zirconia Thin Films and Their Application to Solid Oxide Fuel Cell", The 30th Battery Symposium in Japan; Nagoya, Japan, Sep. 27–29, 1989.

"Preparation of Porous Electrodes and Stabilized Zirconia Thick Films for Solid Oxide Fuel Cells", International Symposium on Solid Oxide Fuel Cell Japan Fine Ceramics Center; Nagoya, Japan, Nov. 13–14, 1989.

* cited by examiner

Primary Examiner—Susy Tsang-Foster
(74) Attorney, Agent, or Firm—Notaro & Michalos P.C.

(57) ABSTRACT

The strength of a cell stack is improved, and processing of components is facilitated to decrease the processing cost. Further, an output characteristic is enhanced, and the material cost is reduced. A single cell 1 includes a fuel electrode (porous fuel electrode substrate) 2 consisting of a porous substrate, an electrolyte film 3 formed on one of a front surface and a back surface of the porous fuel electrode substrate 2, an air electrode film 4 formed on the electrolyte film 3, a separator film 5 formed on the other surface of the porous fuel electrode substrate 2, and a porous air electrode substrate 6 jointed to the air electrode film 4. A stack 14 is formed by laminating these single cells 1 and attaching manifold plates 11 on side surfaces.

10 Claims, 11 Drawing Sheets

UNIT CELL OF FLAT SOLID OXIDE FUEL CELL AND FUEL CELL STACK COMPRISING THE SAME

TECHNICAL FIELD

The present invention relates to a single cell of a flat plate type solid oxide fuel cell and a cell stack utilizing this single cell. More particularly, the present invention relates to improvement in the structure of a single cell.

BACKGROUND ART

A solid oxide fuel cell includes an air electrode to which air containing oxygen is supplied from the outside, a fuel electrode to which fuel gas such as hydrogen, carbon monoxide or methane is supplied from the outside, and an electrolyte through which oxygen ions can pass between these electrodes, and is constituted to generate electric power by electrochemical reaction of fuel gas and oxygen ions. At the air electrode, electrons supplied from an external circuit react with oxygen in air so that oxygen ions are produced. Then, the oxygen ions pass through the electrolyte to reach the fuel electrode. Further, at the fuel electrode, the oxygen ions having passed through the electrolyte react with fuel gas so that products are emitted and electrons are supplied to an external circuit.

As one conformation of this solid oxide fuel cell, there is conventionally a flat plate type. In the flat plate type solid oxide fuel cell, a fuel electrode film is formed on one surface (for example, a front surface) of an electrolyte plate, and an air electrode film is formed on the other surface (for example, a back surface), thereby forming a single cell. Then, a plurality of single cells are superposed each other with a separator plate having a gas flow path formed thereto being sandwiched therebetween, thereby forming a laminated body. Furthermore, when a metal manifold plate for distributing gas in accordance with each electrode is attached around the laminated body, a cell stack is formed.

In this flat plate type solid oxide fuel cell, however, since the structural strength of the cell stack is assured by the electrolyte plate and the separator plate, the extremely high accuracy of the dimension or flatness of the electrolyte plate or the separator plate is demanded in order to prevent the cell stack from being damaged due to the thermal stress generated during heating such as power generation. The processing cost of the electrolyte plate and the separator plate is therefore increased, and the quality control of these plates must be performed strictly.

Moreover, since the separator plate and the single cell are superposed as separate members, the electric resistance between these members becomes large, and large losses are generated in the electrical output from the stack.

In addition, since the separator plate has flow paths between respective electrodes by providing, e.g., ribs in order to distribute gas, the separator plate does not have enough strength and is apt to be damaged. Additionally, its processing cost is increased.

Further, since a material used for the separator plate is relatively expensive and must have an enough thickness in order to assure the strength, the material cost of the cell stack is increased.

Furthermore, since the manifold plate provided around the laminated body constituted by superposing the single cells is made of metal, the thermal expansion coefficient of the manifold plate is greatly different from that of the laminated body of the single cells. Therefore, the thermal stress is produced between the laminated body and the manifold plate during electric power generation, which can be a factor of damage to the cell and stack.

It is an object of the present invention to provide a single cell of a flat plate type solid oxide fuel cell and a cell stack utilizing this single cell which can improve the strength of the cell and/or stack and facilitate processing of components to reduce the processing cost. Moreover, it is another object of the present invention to provide a single cell of a flat plate type solid oxide fuel cell and a stack utilizing this single cell which can improve the output characteristic and reduce the material cost.

DISCLOSURE OF INVENTION

To achieve this aim, according to the present invention, there is provided a single cell of a flat plate type solid oxide fuel cell, the single cell comprising: a first electrode member consisting of a porous substrate; an electrolyte film formed on any one of a front surface and a back surface of the first electrode member; a second electrode member formed on the electrolyte film; and a separator film formed on the other surface of the first electrode member, wherein the first electrode member is one of a fuel electrode and an air electrode, and the second electrode member is the other one of the fuel electrode and the air electrode.

Therefore, since the first electrode member is formed by a porous substrate, gas can come into contact with the first electrode member while passing through the inside of the first electrode member, thereby causing a reaction. Thus, since ribs or the like for forming a gas flow paths do not have to be provided, the structure of the single cell can be simplified, and the strength can be improved. As a result, the size of the single cell can be increased, and the power generation characteristic can be hence enhanced. In addition, since the gas passes through the inside of the porous substrate, a contact area of the first electrode member with respect to air per unit capacity can be enlarged. Consequently, the power generation performance by the single cell can be improved.

Additionally, since the first electrode member is formed by the porous substrate, the first electrode member can be softer than an solid matter composed of a material forming the electrode member. Accordingly, since the thermal stress of the cell and stack obtained by superposing the single cells during the power generation operation can be absorbed and alleviated, the high flexibility of the cell stack can be obtained, thereby improving the strength. Further, since the high processing accuracy of the single cell for avoiding damage due to the thermal stress is no longer necessary, the production cost can be reduced, and the quality control can be facilitated.

Furthermore, since a separator film is directly formed to the first electrode member consisting of the porous substrate, the separator film enters multiple minute holes on the surface of the first electrode member, and contact areas between the first electrode member and the separator film can be thereby increased. As a result, the contact resistance (electrical resistance at contact parts) between the first electrode member and the separator can be greatly reduced, thereby improving the power generation performance.

In addition, since both the separator and the electrolyte are films, for example, thin films each having a thickness of a several ten micron, the power losses caused due to the internal resistance of these films can be reduced. As a result, the power generation performance can be improved.

Additionally, since the separator is formed of a film, a quantity of an expensive separator material to be used can be decreased. Consequently, the manufacturing cost of the single cell can be reduced.

Further, according to the present invention, in the single cell of the flat plate type solid oxide fuel cell, at least one of a part of the electrolyte film and a part of the separator film is a seal portion which covers all or a part of side surfaces of the first electrode member and functions as a gas seal film.

Therefore, since the inside and the outside of the first electrode member are shielded by the electrolyte film and the separator film, and the seal portion, the air or the fuel gas can pass through the inside of the first electrode member without wastefully leaking it out of the first electrode member.

Furthermore, according to the present invention, in the single cell of the flat plate type solid oxide fuel cell, the seal portion includes: a side film portion which covers each entire area of one of two pairs of opposed side surfaces of the first electrode member and seals that pair of side surfaces to prevent the gas from escaping; and a corner film portion which covers both end portions of the other pair of opposed side surfaces of the first electrode portion close to the former pair of opposed side surfaces and seals a part between those both end portions except a gas inflow/outflow opening to prevent the gas from escaping.

Therefore, the one pair of side surfaces of the first electrode member are covered with the side film portions, and the both end portions of the other pair of side surfaces are covered with the corner film portions, and it is hence possible to prevent the flow gas from leaking from parts of the side surfaces of the first electrode member except the gas inflow/outflow opening.

Here, in the single cell of the flat plate type solid oxide fuel cell according to the present invention, preferably at least one of the electrolyte film and the separator film, or more preferably both of these films are formed to the first electrode member by a wet process. In this case, since the films can be formed by the wet process at the low cost, the inexpensive single cell can be obtained.

On the other hand, according to the present invention, there is provided a cell stack of a flat plate type solid oxide fuel cell, the stack comprising a laminated body which is constituted by superposing the above-described single cells in series and has a conductive spacer provided between adjacent single cells in the lamination direction.

Therefore, since the gas can pass through the spacer portion, the gas can be supplied to the second electrode member, thereby generating power.

Moreover, in the cell and stack of the flat plate type solid oxide fuel cell according to the present invention, the spacer is a porous substrate.

Therefore, since ribs or the like for forming gas flow paths do not have to be provided to the spacer, the structure of the single cell can be simplified, and the strength can be improved. In addition, since the spacer can be formed soft by the porous structure, the thermal stress between the superposed single cells during the power generation operation can be absorbed and alleviated so that the high flexibility of the cell stack can be obtained, thereby improving the strength. Additionally, since the high processing accuracy of the single cell for avoiding damage due to the thermal stress is no longer necessary, the manufacturing cost can be reduced.

Further, in the cell stack of the flat plate type solid oxide fuel cell according to the present invention, the porous substrate as the spacer is formed of a material which is the same as that of the second electrode member.

In such a case, it is possible to suppress generation of the thermal stress caused due to a difference in the coefficient of thermal expansion or the like between the spacer and the second electrode member. Furthermore, since the spacer can function as a part of the second electrode member, thereby improving the power generation performance.

Moreover, in the cell stack of the flat plate type solid oxide fuel cell according to the present invention, a conductive jointing material is provided between the spacer and the separator film opposed to each other in adjacent single cells.

Accordingly, since a contact area of the spacer and the separator film of the single cells which are adjacent to each other in the lamination direction can be enlarged, the contact resistance between these members can be reduced. As a result, the power generation performance by the stack can be improved.

In addition, in the cell and/or stack of the flat plate type solid oxide fuel cell according to the present invention, manifold plates composed of ceramics are attached to side surfaces of the laminated body.

The thermal expansion coefficient of the manifold plate can be, therefore, equal to that of the laminated body. As a result, generation of the thermal stress during power generation or the like can be suppressed, and the cell and stack can be prevented from being destroyed.

Here, in the cell and stack of the flat plate type solid oxide fuel cell according to the present invention, the ceramics forming the manifold late is free-cutting glass ceramics.

Therefore, since the manifold plate can be easily cut, the laminated body can be assembled, and the manifold plates can be provided around the laminated body. Thereafter, through holes for gas can be formed in the manifold plates. Here the hole forming operation can be performed by attaching the manifold plates to the laminated body in advance and confirming the positions at which the through holes for gas are to be formed while looking toward side surfaces of the laminated body on which no manifold plate is attached. Therefore, through holes do not have to be forced in the manifold plate in advance, and the accuracy of the positions of the through holes can be readily improved. Consequently, since the through holes for gas do not have to be previously formed to the manifold plate, before attaching it, based on measurement values of the laminated body as in the prior art, the high processing accuracy is no longer necessary. As a result, the manufacturing cost can be reduced, and the quality control can be facilitated.

Further, in the cell stack of the flat plate type solid oxide fuel cell according to the present invention, the lamination direction of the laminated body is horizontal, and the first electrode member and the spacer are arranged so as to be orthogonal to the lamination direction.

Here, in the cell stack according to the present invention, since the structural strength of the laminated body is secured by the first electrode member and the spacer, the higher strength can be obtained as compared with the case where the strength is assured by the electrolyte plate as in the prior art. Thus, even if the lamination direction of the laminated body is set to be horizontal, the sufficient strength with respect to warpage can be obtained. Furthermore, by setting the lamination direction of the laminated body to be horizontal like above, flow directions of the fuel gas and the air can be orthogonal or horizontal. Accordingly, a degree of freedom of installation of the cell stack can be improved.

BRIEF DESCRIPTION OF DRAWINGS

FIG. 11 is a perspective view showing still another embodiment of an electrolyte film.

BEST MODE FOR CARRYING OUT THE INVENTION

Figure 1:
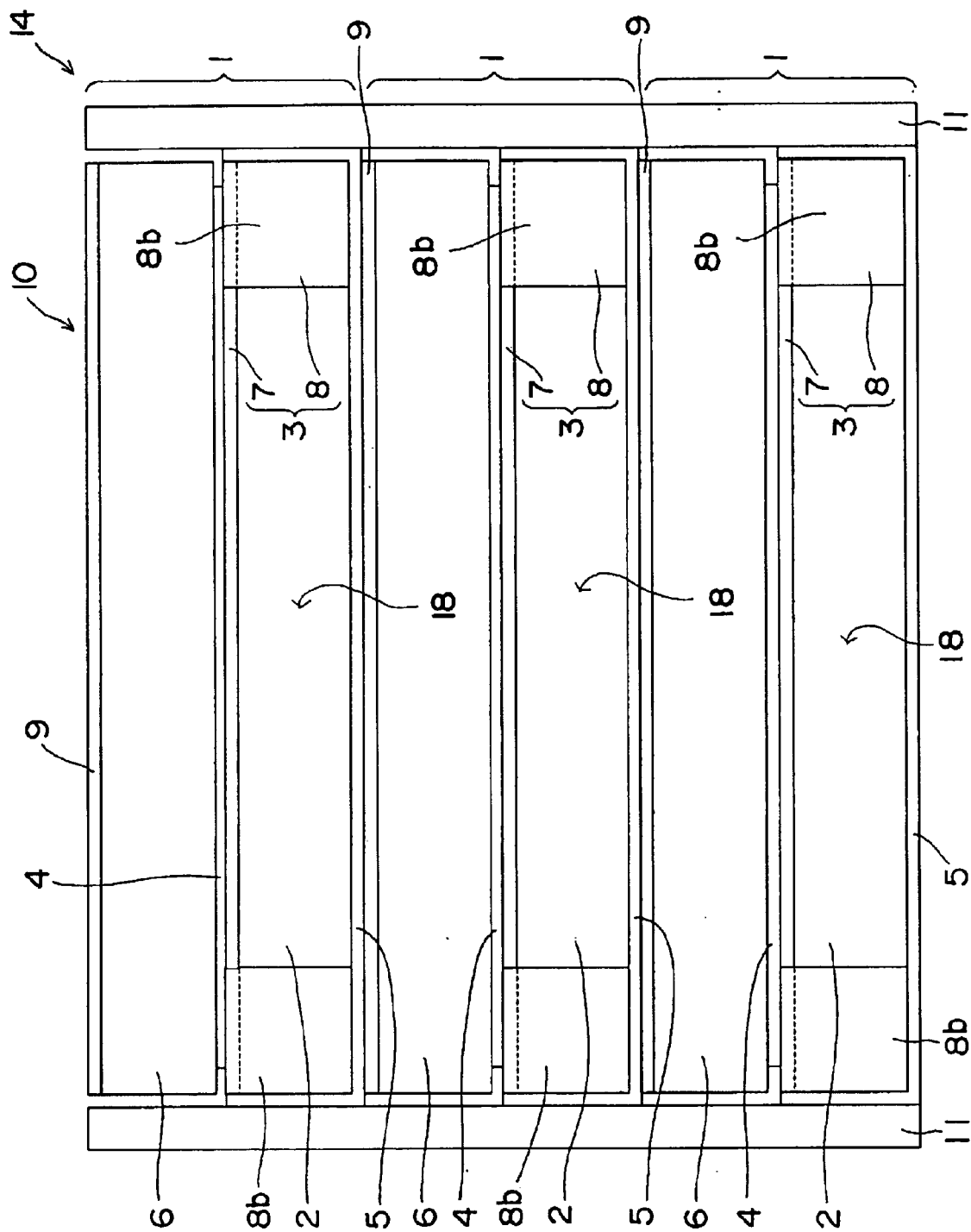
FIG. 1 is a side view showing a stack of a flat plate type solid oxide fuel cell according to the present invention.
Figure 5:
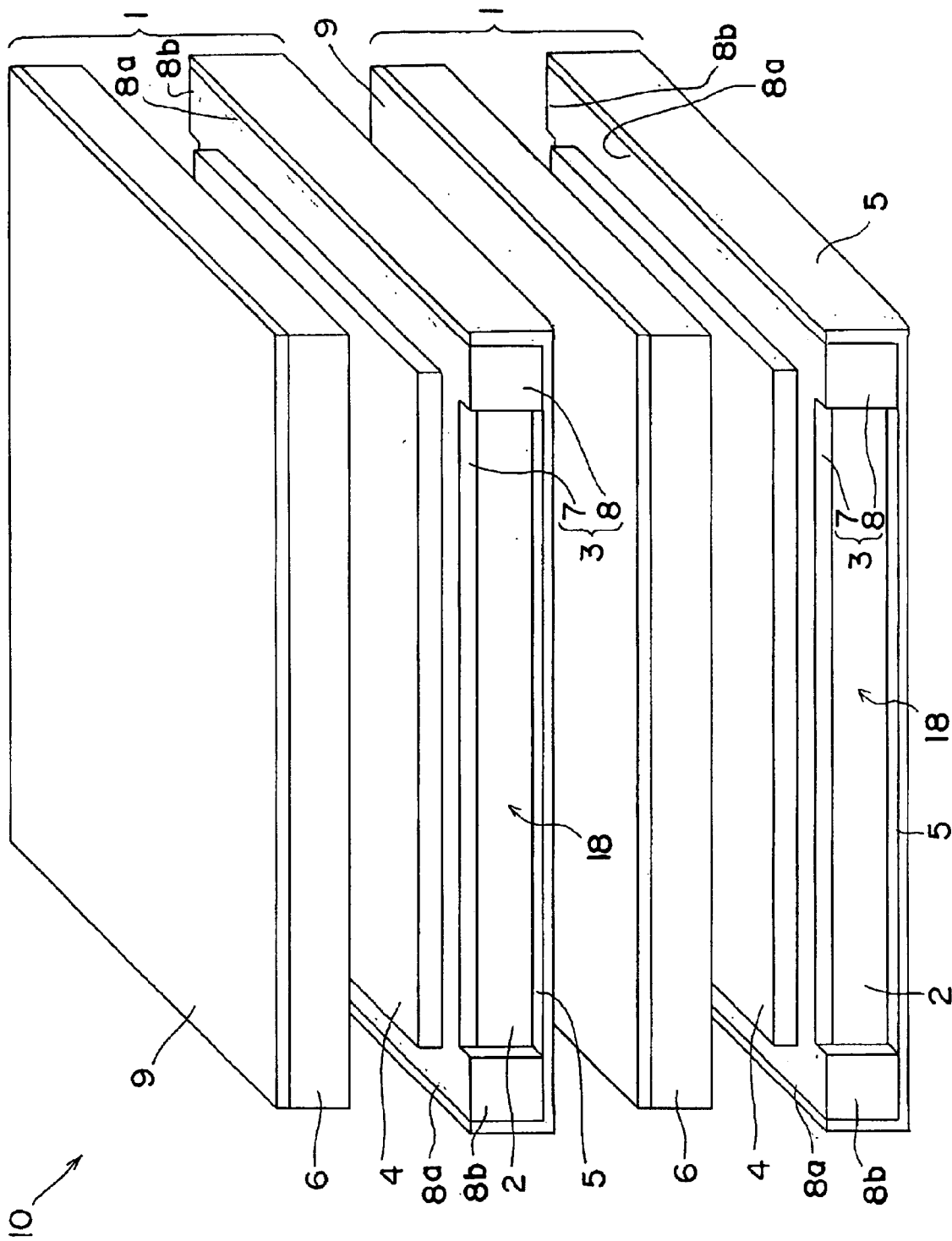
FIG. 5 is a perspective view showing the state in which the single cells are superposed to produce a laminated body.

The structure of the present invention will now be described in detail hereinafter based on an example of an illustrative preferred embodiment. As shown in FIGS. 1 and 5, a single cell 1 of a flat plate type solid oxide fuel cell (SOFC) according to this embodiment includes: a first electrode member consisting of a porous substrate; an electrolyte film 3 formed on any one of a front surface and a back surface of the first electrode member; a film-like second electrode member formed on the electrolyte film 3; and a separator film 5 formed on the other surface of the first electrode member. The first electrode member is one of a fuel electrode and an air electrode, and the second electrode member is the other one of these electrodes. In this embodiment, the first electrode member is determined as a fuel electrode (which will be referred to as a porous fuel electrode substrate hereinafter) 2, and the second electrode member is determined as an air electrode film 4.

The porous fuel electrode substrate 2 is composed of, for example, a porous rectangular plate material obtained by mixing and sintering nickel (nickel oxide during manufacture) and zirconia (YSZ) obtained by stabilizing yttria. This mixed material of nickel and YSZ is generally used as a fuel electrode material of a flat plate type SOFC. Further, this porous plate material is formed so that the fuel gas can satisfactorily pass through it and has the necessary strength as the single cell 1 and the sufficient conductivity for electrons or oxygen ions. Therefore, since the fuel electrode is formed by a porous substrate, a contact area of the electrode member relative to the fuel gas per unit capacity can be enlarged, thereby improving the power generation performance. Furthermore, since the structure of the single cell 1 can be simplified as compared with the complicated structure of the prior art single cell forming a gas flow path by providing a rib or the like, it is no longer necessary to increase the assembling accuracy. Thus, production of a stack 14 can be facilitated, and the strength against the thermal stress or the external force can be improved. Moreover, since the strength of the stack 14 can be heightened, the power generation performance of the stack 14 can be improved by enlarging the dimension of the porous fuel electrode substrate 2 and others.

In addition, since the fuel electrode is composed of a porous substrate in this embodiment, the strength of the single cell 1 can be assured by these fuel electrodes themselves. Therefore, although an electrolyte and a separator must be plate materials having a certain degree of thickness in order to assure the strength of the single cell 1 in the prior art, the electrolyte and the separator can take the form of films. For example, a film thickness of each of an electrolyte film 3 and a separator film 5 is approximately several ten $\mu$m. Thus, power losses in the electrolyte film 3 and the separator film 5. can be prevented, and the power generation performance of the flat plate type SOFC can be improved.

Here, as a material used for the porous fuel electrode substrate 2, use of a fuel electrode material according to an invention that the present applicant has already filed is preferable. This fuel electrode material is a mixture of a YSZ coarse particle powder having a relatively large particle size, a YSZ fine particle powder having a relatively small particle size, and nickel oxide or a nickel particle powder (see Japanese Patent Application No. 127375/1995). According to this mixture, since a skeleton structure is formed by the YSZ coarse particles inside the porous fuel electrode substrate 2, the strength of the single cell 1 can be improved, and changes in the porosity or contraction of a volume can be greatly reduced under the high temperature/reducing atmosphere. Thus, the life duration of the porous fuel electrode substrate 2 can be extended, and the high performance can be stabilized for a long time.

Although the porous fuel electrode substrate 2 is composed of a mixed material of nickel and YSZ in this embodiment, the present invention is not restricted thereto, and it is needless to say that a known or new material can be used as the fuel electrode material. In such a case, since the fuel electrode is formed by the porous fuel electrode substrate 2, the power generation performance can be improved. Moreover, simplifying the structure of the single cell 1 can improve the strength against the thermal stress or the external force.

In addition, as the electrolyte film 3 provided between the fuel electrode and the air electrode, use of a YSZ film which is dense so as not to pass through the fuel gas or the air is preferable. Additionally, the YSZ of the electrolyte film 3 enters many minute holes of the porous fuel electrode substrate 2 depending on a film formation method. Therefore, as compared with formation of a film of a relatively dense fuel electrode on the YSZ flat plate as in the prior art, a contact area of the fuel electrode with respect to the electrolyte can be enlarged, and the electrode reaction fields can be increased. Also, a large quantity of oxygen ion paths can be formed. Accordingly, the performance of the flat plate type SOFC can be improved. Moreover, although the electrolyte film 3 is composed of the YSZ film in this embodiment, the present invention is not restricted thereto, and a known or new material which can be used as the electrolyte film may be utilized. In this case, a contact area of the fuel electrode with respect to the electrolyte can be also enlarged, thereby increasing the electrode reaction fields.

The separator film 5 is provided between the single cells 1 and separates the fuel gas and the air so as not to mix them.

This separator film 5 is composed of a film of ceramics such as strontium doped lanthanum chromite based oxide (lanthanum chromite) which is dense so as not to pass through the fuel gas or the air.

Here, at least one of a part of the electrolyte film 3 and a part of the separator film 5 is a seal portion which covers a part of side surfaces of the porous fuel electrode substrate 2 and functions as a gas seal film. Therefore, since the inside and the outside of the porous fuel electrode substrate 2 are shielded by the electrolyte film 3, the separator film 5, and the seal portion 8, the air or the fuel gas can pass through the inside of the porous fuel electrode substrate 2 without wastefully leaking it out thereof.

In addition, the seal portion 8 includes a side film portion which covers each entire area of one of two pairs of opposed side surfaces of the porous fuel electrode substrate 2 and performs gas seal of those side surfaces, and a corner film portion 8b which covers both end portions of the other pair of opposed side surfaces of the porous fuel electrode substrate 2 close to the former pair of opposed side surfaces and performs gas seal of a part between these both end portions except a gas inflow/outflow opening 18. Thus, since one pair of the side surfaces of the porous fuel electrode substrate 2 are covered with the side film portions and the both end portions of the other pair of the side surfaces are covered with the corner film portions 8b, it is possible to prevent the gas for passing through from leaking from parts of the side surfaces of the porous fuel electrode substrate 2 except the gas inflow/outflow opening 18.

In this embodiment, the electrolyte film 3 is also formed on a part of the side surfaces on the periphery as well as one of the front surface and the back surface of the porous fuel electrode substrate 2. Further, the electrolyte film 3 includes an electrolyte portion 7 which covers either the front surface or the back surface of the porous fuel electrode substrate 2 and functions as an electrolyte, and a seal portion 8 which covers a part of side surfaces of the porous fuel electrode substrate 2 and functions as a gas seal film. Furthermore, the seal portion 8 includes an edge film portion 8a which covers the entire edge portions of a pair of opposed side surfaces of the porous fuel electrode substrate 2 close to the electrolyte portion 7 and performs gas seal of the edge portions, and a corner film portion 8b. Although the seal portion 8 includes the edge film portion 8a which covers the edge portions of one pair of opposed side surfaces in this embodiment, the present invention is not restricted thereto, and the edge film portion 8a may cover the entire side surfaces.

Moreover, in this embodiment, the separator film 5 includes a separator portion which covers a surface of the porous fuel electrode substrate 2 opposed to a surface of the same on which the electrolyte portion 7 is formed, and a side film portion which covers the entire area of one pair of the side surfaces of the porous fuel electrode substrate 2 having the edge film portion 8a formed thereto. Therefore, since the separator film 5 functions as the gas seal film in the entire area having the film formed thereon, the porous fuel electrode substrate 2 enables inflow/outflow of the gas only at the gas inflow/outflow opening 18 at the central portion of a pair of side surfaces on which the separator film 5 and the electrolyte film 3 are not formed. Thus, the fuel gas flows in one direction in the entire porous fuel electrode substrate 2.

The separator film 5 has a thickness which is substantially the same as that of the electrolyte film 3, i.e., a film thickness of approximately several ten $\mu$m. Therefore, electrical losses in the separator film 5 can be prevented, and the power generation performance of the flat plate type SOFC can be improved. In addition, a quantity of a material required for the separator film 5 can be greatly reduced as compared with the case where the conventional separator plate is used, and the manufacturing cost can be hence decreased by reducing the expensive separator material. Although the separator film 5 is formed of a film of ceramics such as lanthanum chromite in this embodiment, the present invention is not restricted thereto, and a known or new material which can be used for the separator film 5 may be utilized. In such a case, electrical losses in the separator film 5 can be also prevented, and the power generation performance of the flat plate type SOFC can be improved.

Additionally, although the gas inflow/outflow opening 18 connected to the porous fuel electrode substrate 2 is previously formed on the single cell manufacturing stage in this embodiment, the present invention is not restricted thereto and, for example, the electrolyte film 3 may cover the entire side surfaces of the porous fuel electrode substrate 2 as well as the electrolyte portion 7 as shown in FIG. 11 and the gas flow opening may not be provided on the single cell manufacturing stage. In this case, although the gas inflow/outflow opening 18 connected to the porous fuel electrode substrate 2 is not formed on the stage for manufacturing the single cell 1, parts of the electrolyte film 3 opposed to a fuel gas flow opening 12 and an air flow opening 13 may be scraped away to form the gas inflow/outflow opening 18 simultaneously with boring the manifold plate 11 when forming the fuel gas flow opening 12 and the air flow opening 13 on the manifold plate 11 on the stage for assembling the stack 14.

Figure 4:
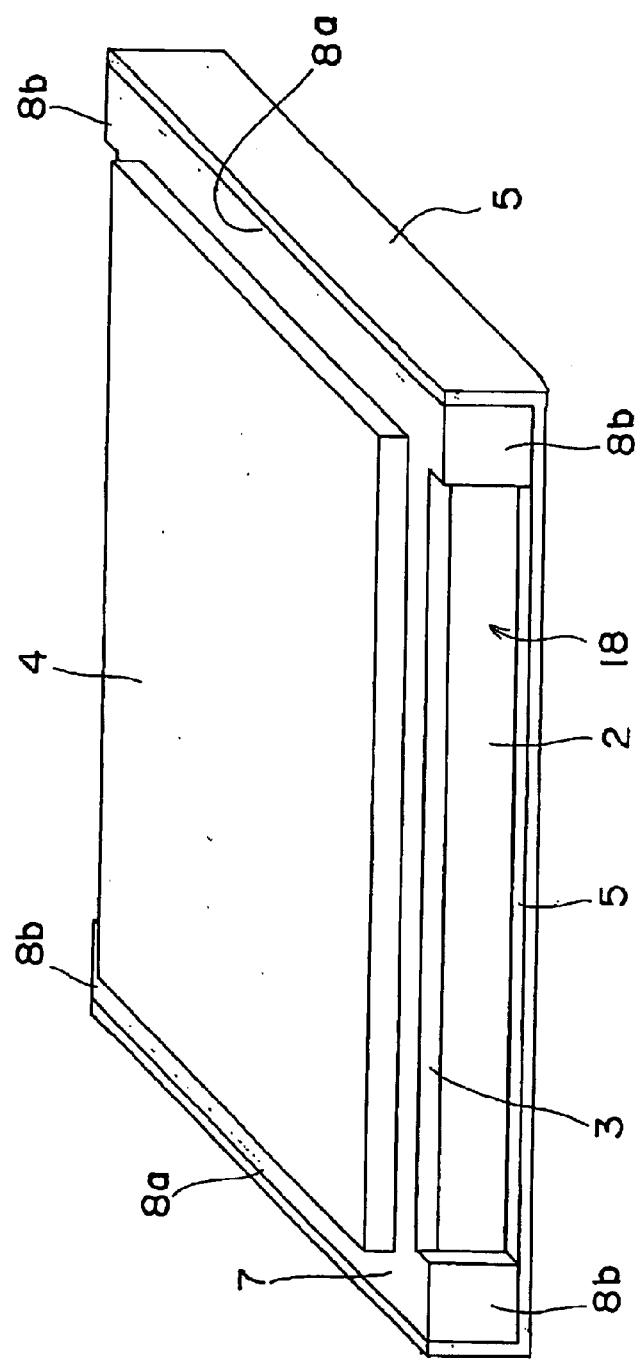
FIG. 4 is a perspective view showing the state in which an air electrode film is formed to the porous fuel electrode substrate illustrated in FIG. 3.

On the other hand, the air electrode film 4 is, as shown in FIG. 4, formed on the side opposed to the porous fuel electrode substrate 2 with the electrolyte film 3 therebetween. In this embodiment, the air electrode film 4 is formed by being superposed on the electrolyte portion 7 of the electrolyte film 3. This air electrode film 4 is composed of a film of lanthanum strontium manganite (compound of La, Sr, Mn and O). This lanthanum strontium manganite is generally used as an air electrode material of the SOFC.

Further, as a material used for the air electrode film 4, an air electrode material according to an invention that the present applicant has already filed is preferable. This air electrode material is a strontium doped lanthanum manganite (see Japanese Patent Application No. 273174/1990) whose element is $(La_{1-x}Sr_x)_{1-y}MnO_{3-z}$ and which satisfies $0<x<0.2$ and $0.025<y<0.75$. Since this material can maintain the single phase even in the vicinity of an operating temperature of the fuel cell and the chemical stableness can be obtained, the chemical reactivity with YSZ is small, and there is produced no resultant product which adversely affects the power generation performance during formation of the YSZ film or the power generation operation. Although the air electrode film 4 is formed of lanthanum strontium manganite in this embodiment, the present invention is not restricted thereto, and it is needless to say that a known or new material can be used as an air electrode material. In this case, since the air electrode is likewise formed by an air electrode film, the power generation performance can be improved, and simplification of the structure of the single cell 1 can enhance the strength against the thermal stress or the external force.

Here, thermal expansion coefficients of respective materials of the porous fuel electrode substrate 2, the electrolyte film 3, the separator film 5 and the air electrode film 4 are substantially equivalent so that each member can not be damaged due to the thermal stress or the like. As a result, even if each member is thermally expanded due to heat generation during the operation of the fuel cell, the single cell can be prevented from being damaged.

When the single cells 1 having the above-described structure are superposed and connected in series, the stack 14 is configured. That is, this stack 14 includes the laminated body 10 which is constituted by superposing the single cells 1 in series and has the conductive spacer provided between the adjacent single cells 1 in the lamination direction. Therefore, the gas can pass through the spacer portion, power can be generated by supplying air to the air electrode film 4.

Furthermore, the spacer in this example is a porous substrate. Consequently, since ribs or the like for forming air flow paths do not have to be provided to the spacer, the structure of the single cell 1 can be simplified and the strength can be improved. Moreover, since the spacer can be formed soft, the thermal stress during the power generation operation of the stack 14 having the single cells 1 being superposed can be absorbed and alleviated, and the high flexibility of the stack 14 can be obtained, thereby improving the strength. In addition, since the high processing accuracy of the single cell 1 for preventing damage due to the thermal stress is no longer necessary, the manufacturing cost can be reduced.

Additionally, the porous substrate as the spacer is composed of a material which is the same as that of the air electrode film 4. That is, this spacer is an air electrode 6 (which will be referred to as a porous air electrode substrate hereinafter) consisting of a porous substrate jointed to the air electrode film 4. Therefore, since the coefficient of thermal expansion of the spacer can be equal to that of the air electrode film 4, occurrence of the thermal stress due to heating during power generation can be suppressed, and the strength can be improved. Further, since the spacer can function as a part of the air electrode together with the air electrode film 4, the power generation performance can be improved.

In this embodiment, the porous air electrode substrate 6 is composed of a material which is the same as that of the air electrode film 4. Furthermore, the porous air electrode substrate 6 consists of a porous plate material obtained by sintering lanthanum strontium manganite. This porous plate material is formed so as to sufficiently pass through the air and have the necessary strength as the single cell 1 and the satisfactory conductivity for electrons or oxygen. Therefore, since the air electrode includes the porous substrate, a contact area of the electrode member with respect to air per unit capacity can be enlarged and the power generation performance can be improved. Moreover, since the structure of the single cell 1 can be simplified as compared with the complicated structure of the conventional single cell having ribs, the assembling accuracy does not have to be increased. Accordingly, production of the stack 14 can be facilitated, and the strength against the thermal stress or the external force can be improved.

In addition, a plurality of the above-described single cells 1 are superposed in series, and a conductive jointing material 9 is provided between the porous air electrode substrate 6 and the separator film 5 of the single cells 1 which are adjacent to each other in the lamination direction, thereby forming the laminated body 10.

The jointing material 9 is composed of ceramics which has, for example, La, Cr, Ni and O as main constituent elements and has the electron conductivity. Additionally, a film of the jointing material 9 is formed on a surface of the porous air electrode substrate 6 opposed to the air electrode film 4. The separator film 5 of the single cell 1 adjacent to this jointing material 9 is jointed to this jointing material 9 by a chemical reaction. Therefore, since a contact area between the porous air electrode substrate 6 and the separator film 5 can be enlarged, the electrical contact resistance between these members can be reduced, and the power generation performance by the stack 14 can be improved. Although the jointing material 9 is formed of ceramics having La, Cr, Ni and O as main constituent elements in this embodiment, the present invention is not restricted thereto, and a known or new material which can be used as a jointing material having the electron conductivity may be used. In this case, a contact area between the porous air electrode substrate 6 and the separator film 5 can be likewise enlarged, and the power generation performance by the stack 14 can be thereby improved.

Additionally, the stack 14 includes the laminated body 10, and the ceramics manifold plate 11 which surrounds the side portions of the laminated body 10 and distributes the fuel gas and air to the respective electrode porous substrates 2 and 6. Here, although FIG. 1 is given as if the spaces between the manifold plate 11 and the porous fuel electrode substrate 2, and the manifold plate 11 and the porous air electrode substrate 6 are partially opened, a thickness of each film is actually several ten $\mu$m. Further, since the manifold plate 11 is pressed against the laminated body 10, the manifold plate 11 and the porous fuel electrode substrate 2, and the manifold plate 11 and the porous air electrode substrate 6 are closely pressed against each other with no spaced provided therebetween. Accordingly, gas does not leak from the space between the manifold plate 11 and the laminated body 10.

In this embodiment, the manifold plate 11 is made of glass ceramics. When the manifold plate 11 is welded on the side portion of the laminated body 10, gas seal of the stack 14 is carried out, and the single cells 1 are combined with each other. Here, since the manifold plate 11 is formed by free-cutting glass ceramics, the operation for boring the fuel gas flow opening 12 or the air flow opening 13 can be facilitated after attaching the manifold plate 11 to the laminated body 10 by the free-cutting property. Although the manifold plate 11 consists of glass ceramics in this embodiment, the present invention is not restricted thereto, and any other ceramics may be used. In such a case, the boring operation can be also easily performed after attaching the manifold plate 11 to the laminated body 10 by the free-cutting property of ceramics.

To a pair of the manifold plates 11, 11, opposed to the exposed side surfaces of the porous fuel electrode substrate 2 of the laminated body 10 which are not covered with the electrolyte film 3, are formed with the fuel gas flow opening 12 which is opened at a position opposed to the gas inflow/outflow opening 18 of the porous fuel electrode substrate 2 and the air flow opening 13 which is opened at a position opposed to the side surface as the gas inflow/outflow opening of the porous air electrode substrate 6. Therefore, a flow path of the fuel gas and that of air can be parallel to each other. For example, if the fuel gas and air can be sucked from one of this pair of the manifold plates 11, 11 and they can be exhausted from the other one, the fuel gas and air can flow in the same direction. Furthermore, if the fuel gas is sucked and the air is exhausted from one of this pair of the manifold plates 11, 11 and the fuel gas is exhausted and the air is sucked from the other one, the fuel gas and air can flow in the opposite directions.

Here, although the gas in the porous substrates 2 and 6 flows in one direction from one side surface to the other side surface as a whole, the gas can not flow straightforward owing to random arrangement of minute holes of the porous substrates 2 and 6 but flows in each of vertical horizontal directions as seen locally.

In this embodiment, each plate material forming the single cell 1 is horizontally set and the single cells 1 are superposed in the orthogonal direction. Thus, the flow directions of the fuel gas and air are all horizontal. Although each plate material forming the single cell 1 is horizontally set in this embodiment, the present invention is not restricted thereto, each plate material forming the single cell 1 can be orthogonally set by utilizing the fact that the single cell 1 in this embodiment has the high strength. That is, in the conventional cell stack using no porous substrate to the electrode member, when each plate material is orthogonally set, its own weight can not be supported and each plate material may be possibly warped. However, since the stack 14 having the single cells 1 being superposed according to this embodiment has the high strength, even if each plate material is orthogonally set, the strength against warpage can be improved as compared with that of the prior art. Furthermore, in this case, flow directions of the fuel gas and air can be the same to or opposed to the orthogonal direction. Moreover, flow paths of the fuel paths of the fuel gas and air can be set horizontally, orthogonally as well as diagonally depending on the setting direction of the stack 14.

Figure 8:
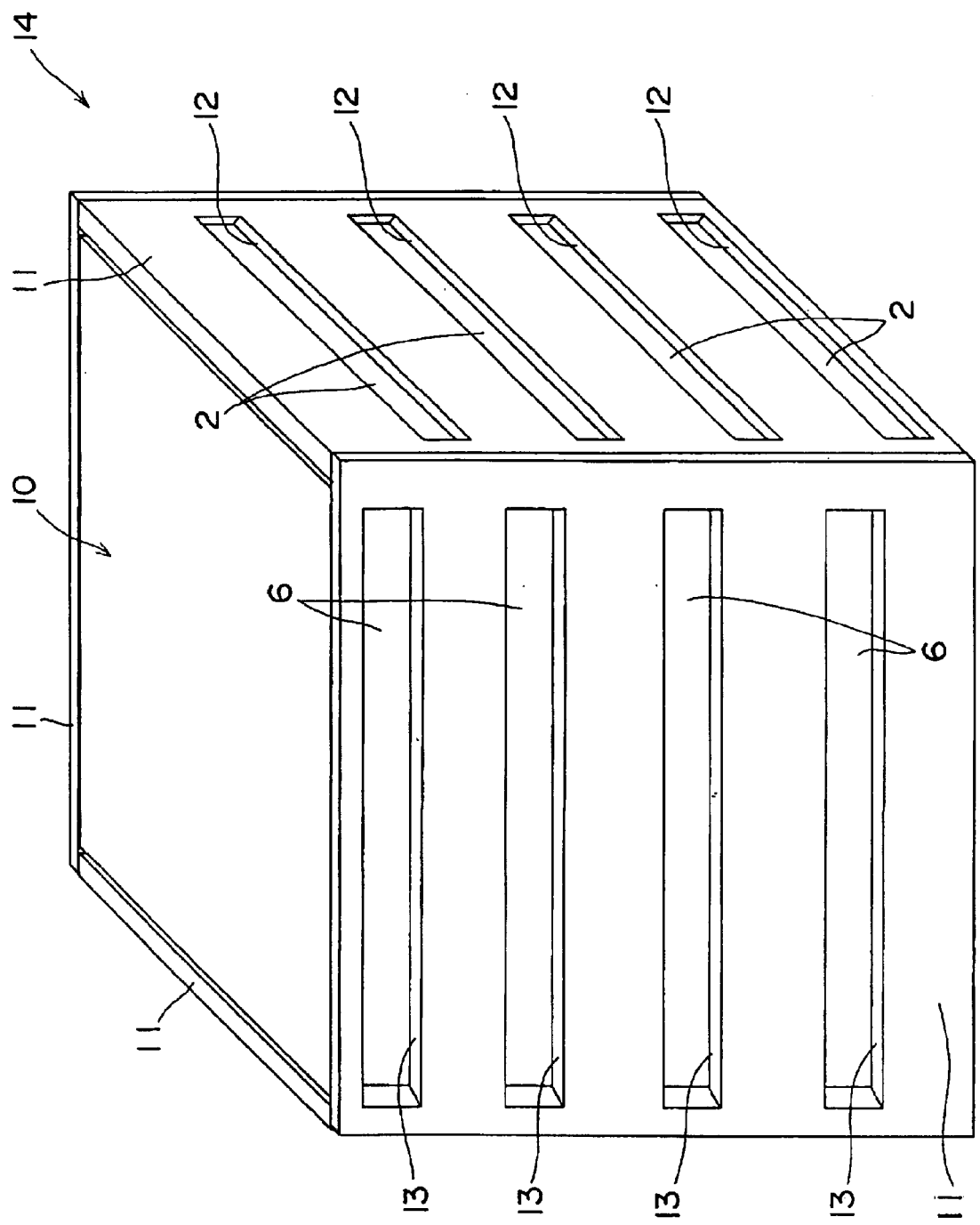
FIG. 8 is a perspective view showing another embodiment of a stack of a flat plate type solid oxide fuel cell.

Although the fuel gas flow opening 12 and the air flow opening 13 are formed to a pair of the manifold plates 11, 11 opposed to the exposed side surfaces on which the porous fuel electrode substrate 2 of the stack 14 which is not covered with the electrolyte film 3 in this embodiment, the present invention is not restricted thereto. For example, as shown in FIG. 8, only the fuel gas flow opening 12 may be formed to a pair of the manifold plates 11 opposed to the side surfaces on which the porous fuel electrode substrate 2 of the stack 14 is exposed, and the air flow opening 13 may be formed to the other pair of the manifold plates 11, 11. In this case, a flow path of the fuel gas can be orthogonal to that of air as seen from the lamination direction of the stack 14. Moreover, when the stack 14 is set by horizontally setting each plate material of the single cell 1, the both flow directions of the fuel gas and air become horizontal. In addition, when the stack 14 is set by orthogonally setting each plate material of the single cell 1, one of the flow directions of the fuel gas and air becomes orthogonal and the other flow direction becomes horizontal, or the both flow directions become diagonal.

The manufacturing procedure of the flat plate type SOFC having the above-described stack 14 will now be described hereinafter. When manufacturing the porous fuel electrode substrate 2, nickel oxide and YSZ are mixed and, for example, a molding agent such as methyl cellulose or poly vinyl alcohol is then added. Thereafter, press molding is carried out. Alternatively, the mixed material of nickel oxide, YSZ and the molding agent is made clayey and extruded. Subsequently, the obtained molding is sintered at approximately 1400° C., thereby forming the porous fuel electrode substrate 2. Here, manufacturing conditions such as the strength of pressing or extrusion pressure or the sintering temperature are set in such a manner that the formed porous fuel electrode substrate 2 can have the porosity such that the fuel gas can be easily passed and the necessary mechanical strength for the signal cell 1 can be provided. Here, if the mechanical strength is set lower than that of a solid matter consisting of a material of the porous fuel electrode substrate, the thermal stress during the power generation operation of the stack 14 can be absorbed and alleviated, and the strength of the stack 14 can be hence enhanced.

Figure 2:
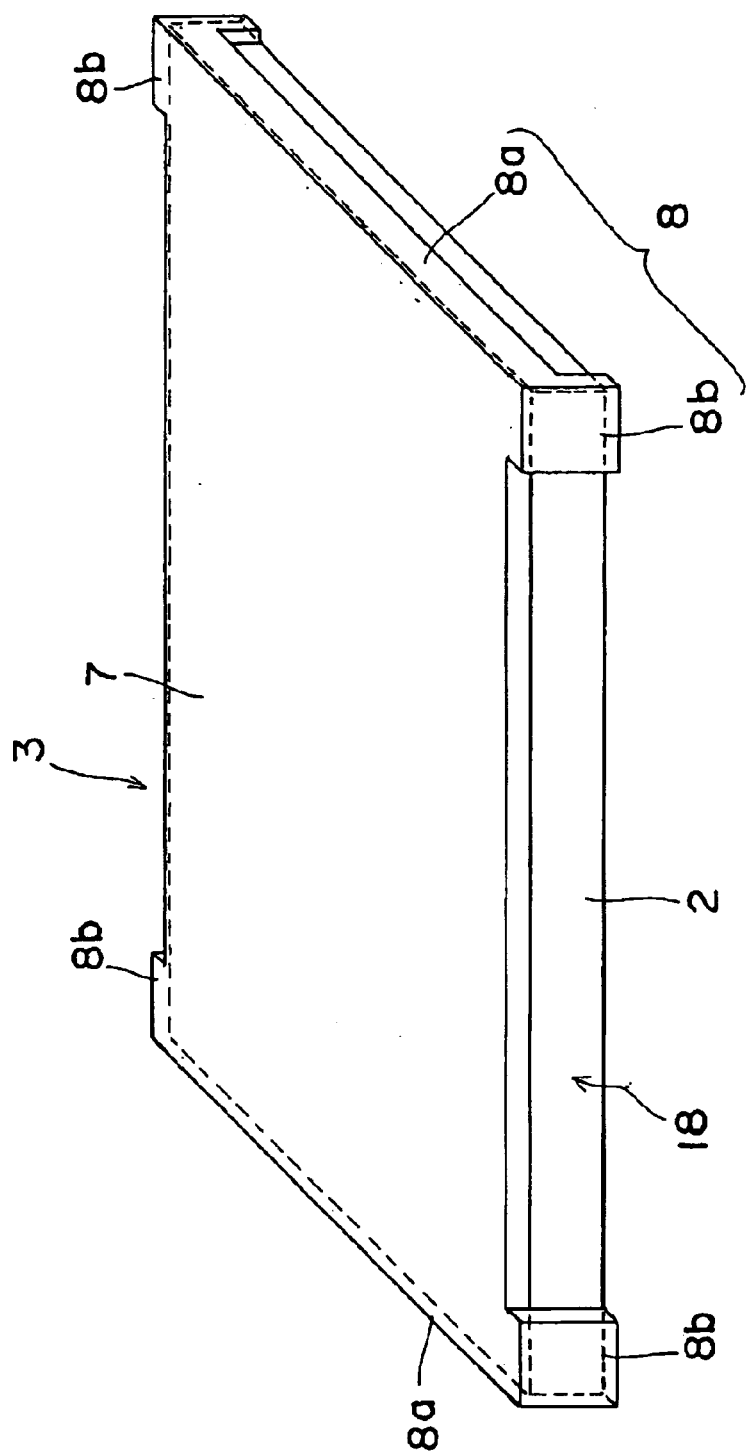
FIG. 2 is a perspective view showing the state in which an electrolyte film is formed to a porous fuel electrode substrate.
Figure 3:
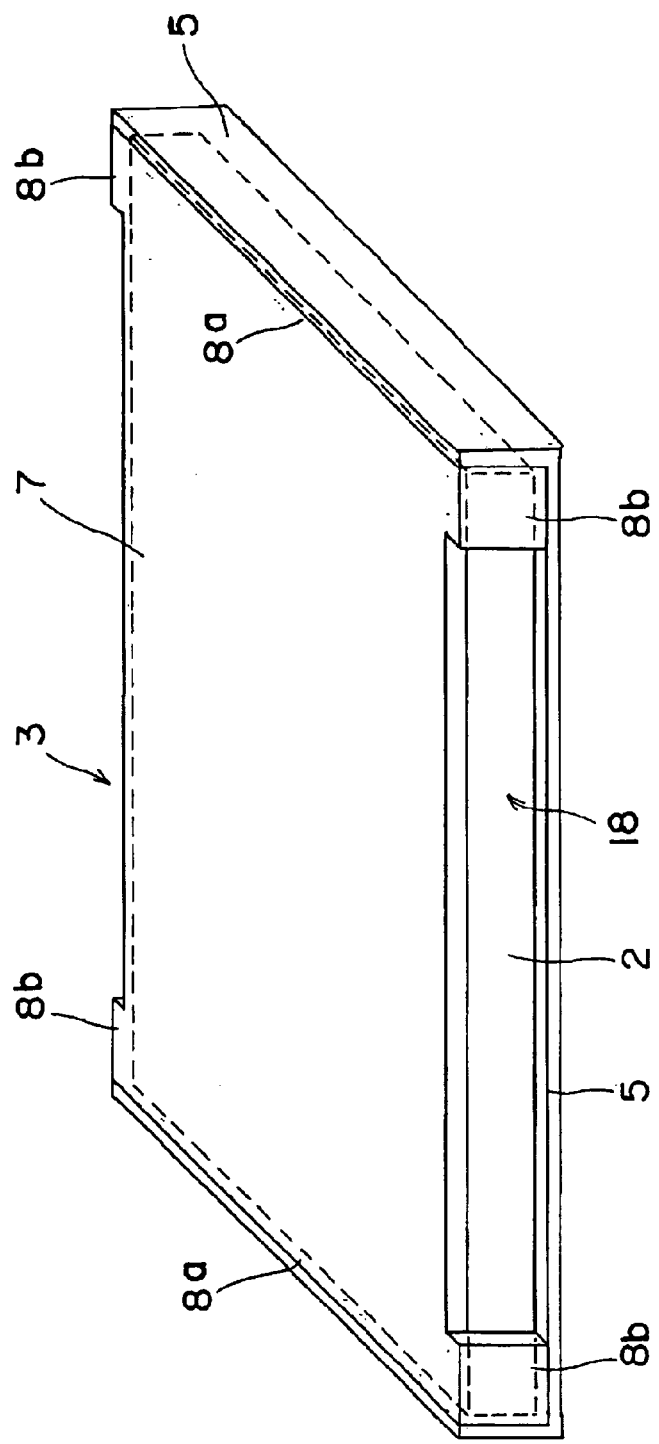
FIG. 3 is a perspective view showing the state in which a separator film is formed to the porous fuel electrode substrate depicted in FIG. 2.

As shown in FIG. 2, the electrolyte film 3 is formed to the thus obtained porous fuel electrode substrate 2. Moreover, the separator film 5 is formed to the porous fuel electrode substrate 2, as shown in FIG. 3. As a method for forming the electrolyte film 3 and the separator film 5, any of a wet process, a slurry coating method, a coating thermal decomposition method, a sol-gel process and the like which are well known can be used, and the present invention is not restricted specific method. A film having a thickness of several ten $\mu$m can be formed by any method. In addition, for example, the films can be manufactured by a simultaneous sintering method by which an unbaked film produced by a tape cast method is attached to the unbaked porous fuel electrode substrate 2 and they are then simultaneously sintered. In such a case, since the number of times of heat treatment can be reduced, the manufacturing cost can be lowered.

Additionally, as shown in FIG. 4, the air electrode film 4 is formed to the electrolyte film 3. This film forming method is not restricted to a specific type as similar to the method for forming the electrolyte film 3 and others, and the above-described various methods can be used.

Further, in case of manufacturing the porous air electrode substrate 6, a molding agent such as methyl cellulose or poly vinyl alcohol is added to lanthanum strontium manganite, and press molding or extrusion is effected as similar to the porous fuel electrode substrate 2. Thereafter, the obtained molding material is baked at approximately 1100 to 1200° C. At this moment, the formed porous air electrode substrate 6 is set in such a manner that it can have the porosity such that air can be easily passed and the necessary mechanical strength for the single cell 1 can be provided. Here, a sintering temperature (1100 to 1200° C.) of the porous air electrode substrate 6 is lower than the sintering temperature (1400° C.) of the porous fuel electrode substrate 2. Therefore, the porous air electrode substrate 6 has the mechanical strength lower than that of the porous fuel electrode substrate 2 and the deforming property. As a result, the stress generated inside the stack 14 due to the thermal stress or the external force during power generation can be absorbed by deformation of the porous air electrode substrate 6, thereby preventing destruction.

Additionally, as shown in FIG. 5, the porous fuel electrode substrate 2 is mounted with the separator film 5 facing downwards. The porous air electrode substrate 6 is mounted on the air electrode film 4 of the porous fuel electrode substrate 2. Further, the slurried jointing material 9 is applied on the top face of the porous air electrode substrate 6. Another porous fuel electrode substrate 2 is mounted on the jointing material 9 with the separator film 5 facing downwards. In this manner, the single cells 1 are laminated to form the laminated body 10. The number of the single cells 1 to be laminated is set in accordance with a voltage required for the flat type SOFC to be formed.

Figure 6:
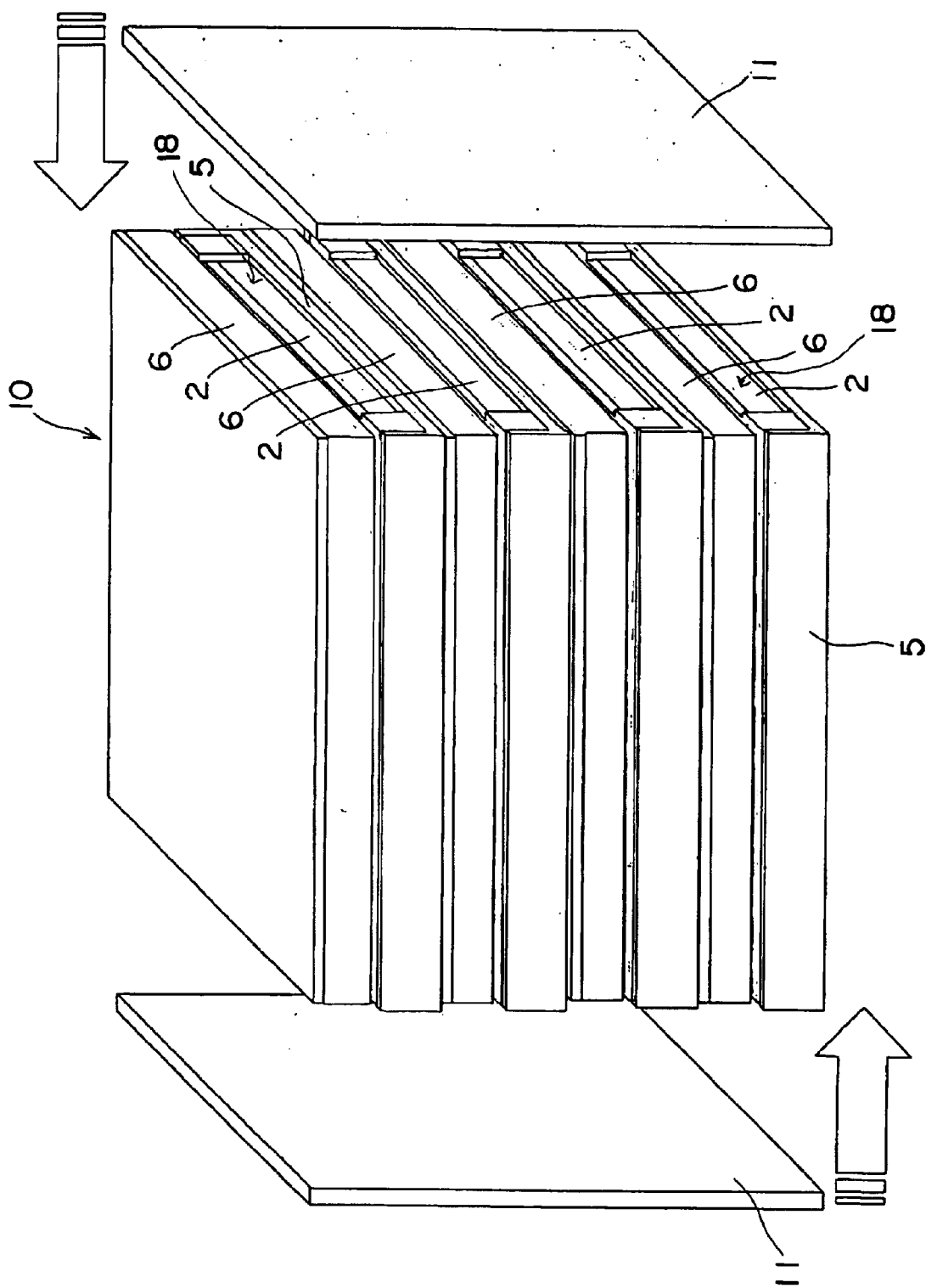
FIG. 6 is a perspective view showing the state in which a manifold plate is attached to the laminated body.

Furthermore, as shown in FIG. 6, the two manifold plates 11, 11 which do not have the fuel gas flow opening 12 and the air flow opening 13 are brought into contact with each other and bundled on a pair of side surfaces positioned on the opposed sides of the laminated body 10. In this state, the heat treatment of approximately 1100° C. is effected. By this heat treatment, the laminated body 10 and the manifold plates 11 are welded and jointed to each other, and the porous air electrode substrate 6 and the separator film 5 can be also jointed to each other.

Figure 7:
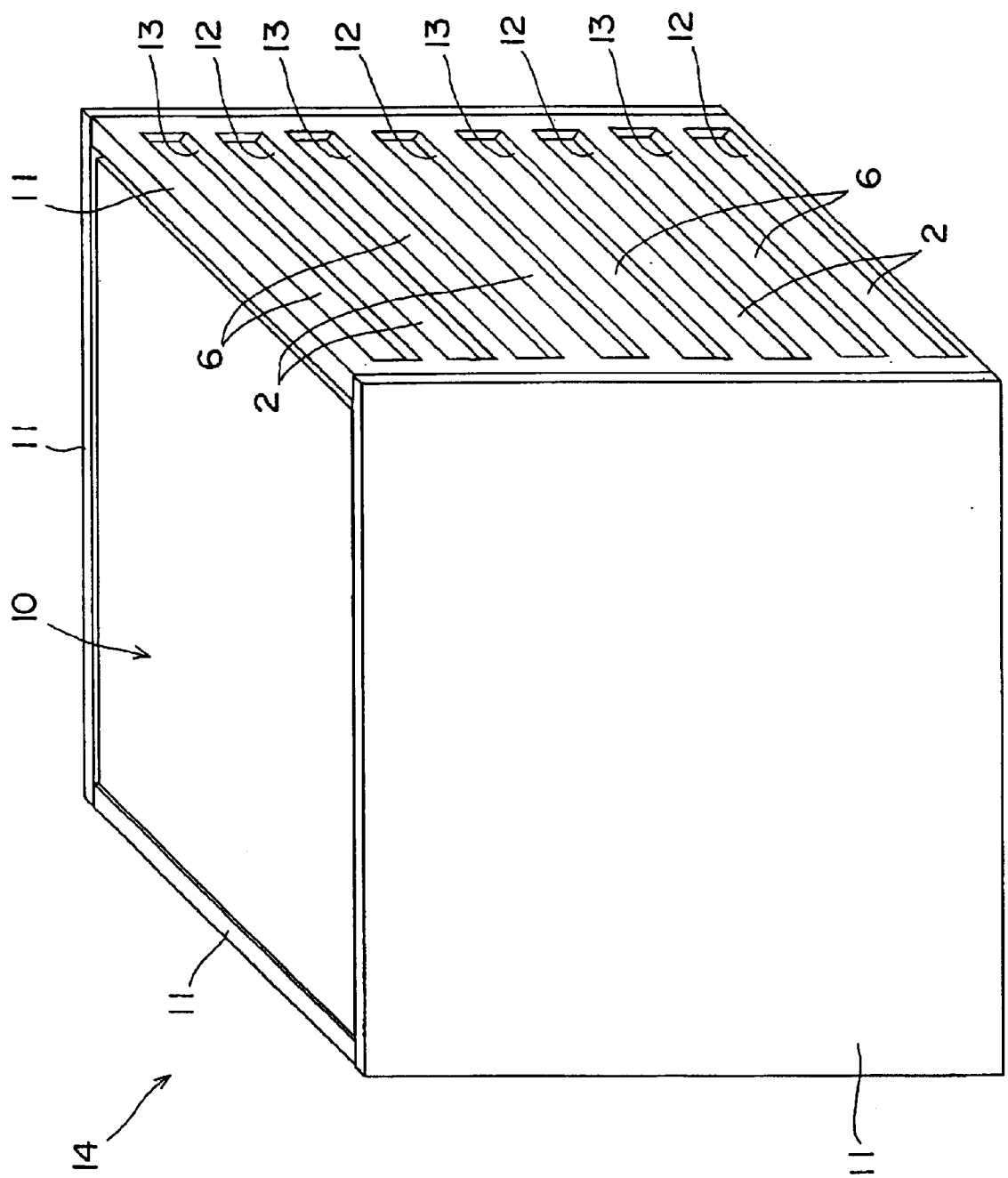
FIG. 7 is a perspective view showing a stack of a flat plate type solid oxide fuel cell according to the present invention.

Then, after the heat treatment, as shown in FIG. 7, the manifold plate 11 is bored to form the fuel gas flow opening 12 and the air flow opening 13. Since this boring process is carried out while visually confirming the positions of the porous fuel electrode substrate 2 and the porous air electrode substrate 6 from the side surface of the laminated body 10 on which the manifold plate 11 is not provided, the fuel gas flow opening 12 and the air flow opening 13 can be easily formed at appropriate positions. Furthermore, since the manifold plate 11 consists of glass ceramics in this embodiment, the boring process can be readily carried out by the free-cutting property of the manifold plate 11. Thus, even if the manifold plate 11 has been already attached to the laminated body 10, the fuel gas flow opening 12 and the air flow opening 13 can be easily formed. As a result, the stack 14 can be manufactured. Moreover, since the manifold plate 11 is formed of glass ceramics in this embodiment, the coefficient of thermal expansion of the manifold plate 11 can be equal to that of the laminated body 10. Consequently, the stack 14 can be prevented from being destroyed due to the thermal stress.

Here, if the porous fuel electrode substrate 2 which covers the entire electrolyte film 3 shown in FIG. 11 is used, the fuel gas flow opening 12 and the air flow opening 13 are formed to the manifold plate 11, and a gas flow opening is formed by scraping off the electrolyte film 3. Moreover, as shown in FIG. 8, in case of forming the fuel gas flow opening 12 and the air flow opening 13 to different pairs of the manifold plates 11, 11, one pair of the manifold plates 11, 11 is attached in advance and, for example, the fuel gas flow opening 12 is formed to this pair. Thereafter, another pair of the manifold plates 11, 11 is attached, and the air flow opening 13 is formed thereto. In this case, although the position of the porous air electrode substrate 6 inside the laminated body 10 can not be visually confirmed when boring the air flow opening 13, the position of the air flow opening 13 can be determined based on the position of the fuel gas flow opening 12.

According to the stack 14 of this embodiment, since the fuel electrode and the air electrode are formed of the porous substrates 2 and 6 so that the fuel gas or air can pass through the inside, a contact area of the electrode member with respect to the gas per unit capacity can be enlarged as compared with the conventional flat plate type electrode plate. Therefore, the number of the electrode reaction fields can be increased, and the power generation performance can be improved. In addition, ribs of the separator used in the prior art flat plate type structure is no longer necessary. As a result, since the assembling accuracy does not have to be improved by simplification of the structure of the single cell 1, the stack 14 can be easily manufactured, and the strength against the thermal stress or the external force can be enhanced. Consequently, the dimension of the stack 14 can be increased, thereby improving the power generation performance.

Additionally, according to the stack 14 of this embodiment, since the porous air electrode substrate 6 is formed soft so that the thermal stress can be absorbed, it is possible to assure high flexibility of the stack 14 which can readily cope with the thermal stress or the external force by deformation. Further, the high strength can be maintained irrespective of vertical setting or horizontal setting of the stack 14. Although the high processing accuracy is required in order to prevent damage due to the stress caused during production and power generation in the prior art flat plate type cell lamination, the high processing accuracy is not demanded according to the stack 14 of this embodiment, and the quality control can be readily effected.

Furthermore, according to the stack 14 of this embodiment, since the separator is composed of a film, an amount of the expensive separator material to be used can be decreased. As a result, the cost of the stack 14 can be lowered.

Moreover, according to the stack 14 of this embodiment, since the separator film 5 is directly formed on the porous fuel electrode substrate 2, a contact area between the porous fuel electrode substrate 2 and the separator film 5 can be enlarged. Consequently, it is possible to greatly reduce the electrical contact resistance between the fuel electrode and the separator which has been conventionally a problem, and the power generation performance can be greatly improved.

Figure 9:
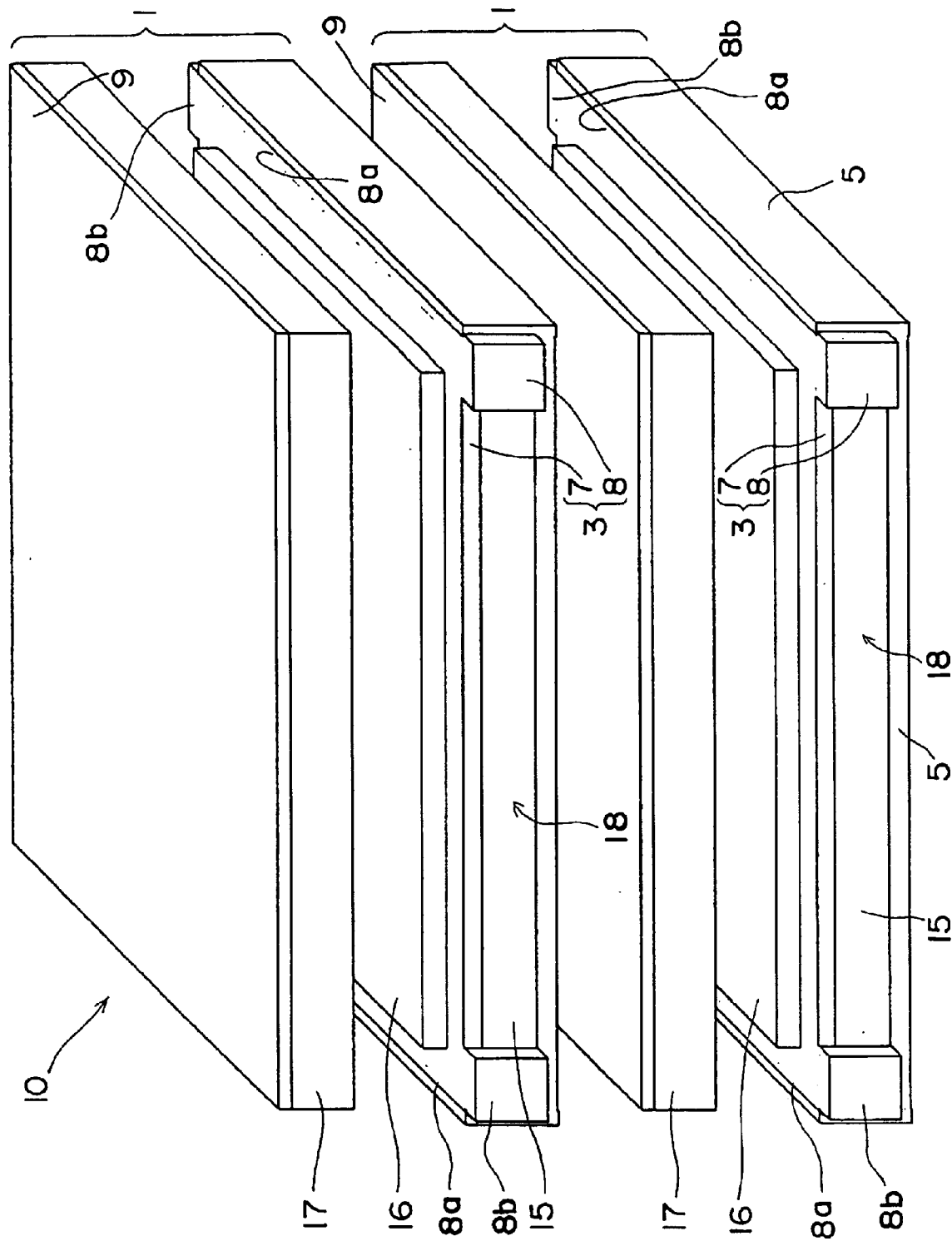
FIG. 9 is a perspective view showing another embodiment of a laminated body.

It is to be noted that the above has described a preferred embodiment according to the present invention but the present invention is not restricted thereto. Various modifications can be carried out without departing from the scope of the present invention. For example, in the single cell 1 of this embodiment, the electrolyte film 3, the separator film 5 and the air electrode film 4 are formed to the porous fuel electrode substrate 2, and the porous air electrode substrate 6 is further laminated thereon. The present invention is not, however, restricted thereto. As shown in FIG. 9, the electrolyte film 3, the separator film 5 and the fuel electrode film 16 may be formed to the porous air electrode substrate 15 and the porous fuel electrode substrate 17 may be further laminated thereon.

Specifically, the porous air electrode substrate 15 may be composed of a porous plate material obtained by sintering, e.g., lanthanum strontium manganite. The electrolyte film 3 and the separator film 5 are formed to this porous air electrode substrate 15. Materials or film formation methods of these electrolyte film 3 and the separator film 5 are similar to those of the porous fuel electrode substrate 2 mentioned above, thereby omitting the explanation. Moreover, as similar to the porous fuel electrode substrate 2 shown in FIG. 4, the seal portion 8 which is the electrolyte film 3 and consists of the edge film portion 8a and the corner film portion 8b is formed to the porous air electrode substrate 15. Here, the fuel electrode film 16 consists of a porous plate material produced by mixing nickel and YSZ and sintering the thus obtained mixture. In addition, the porous fuel electrode substrate 17 is constituted by a porous plate material produced by sintering a mixture of nickel and YSZ. Although the porous fuel electrode substrate 17 is the porous plate material obtained by sintering the powder mixture of nickel and YSZ in this embodiment, the present invention is not restricted thereto, and the porous fuel electrode substrate 17 may be formed by using nickel felt.

In addition, a plurality of the above-described single cells 1 are laminated in series, and the conductive jointing material 9 is provided between the porous air electrode substrate 15 and the separator film 5 of the single cells 1 which are adjacent to each other in the lamination direction, thereby forming the laminated body 10. The stack 14 is formed by providing on the laminated body 10 the manifold plate 11 similar to that in the above-described stack 14.

According to the stack 14 of this embodiment illustrated in FIG. 9, since the fuel electrode and the air electrode as the porous substrates 15 and 17 are flow paths for the fuel gas or air as similar to the embodiment shown in FIG. 1, a contact area of the electrode member with respect to the gas per unit capacity can be enlarged, and the power generation performance can be improved. Additionally, since a rib of the separator is no longer necessary, production of the stack 14 can be facilitated, and the strength against the thermal stress or the external force can be improved. Further, since the porous fuel electrode substrate 17 is formed soft so that the stress can be absorbed, it is possible to assure the high flexibility of the stack 14 by coping with the thermal stress or the external force by deformation in any direction, thereby increasing the strength. Furthermore, the high processing accuracy is not required, and the quality control can be readily performed. Moreover, since the separator is formed of a film, the cost of the stack 14 can be reduced. In addition, since the separator film 5 is directly formed to the porous air electrode substrate 15, a contact area between the porous air electrode substrate 15 and the separator film 5 can be enlarged, thus improving the power generation performance.

Additionally, in each of the above-described embodiments, although the stack 14 includes the laminated body 10 having a plurality of the single cells 1 being laminated, the present invention is not restricted thereto, and only one single cell 1 may be used to form the stack 14. In this case, since the fuel electrode and the air electrode are likewise the porous substrates so that the fuel gas or air can pass through the inside, it is possible to obtain the effects similar to those of each of the foregoing embodiment, e.g., increase in a contact area between the gas and the electrode member or improvement in the power generation performance.

Figure 10:
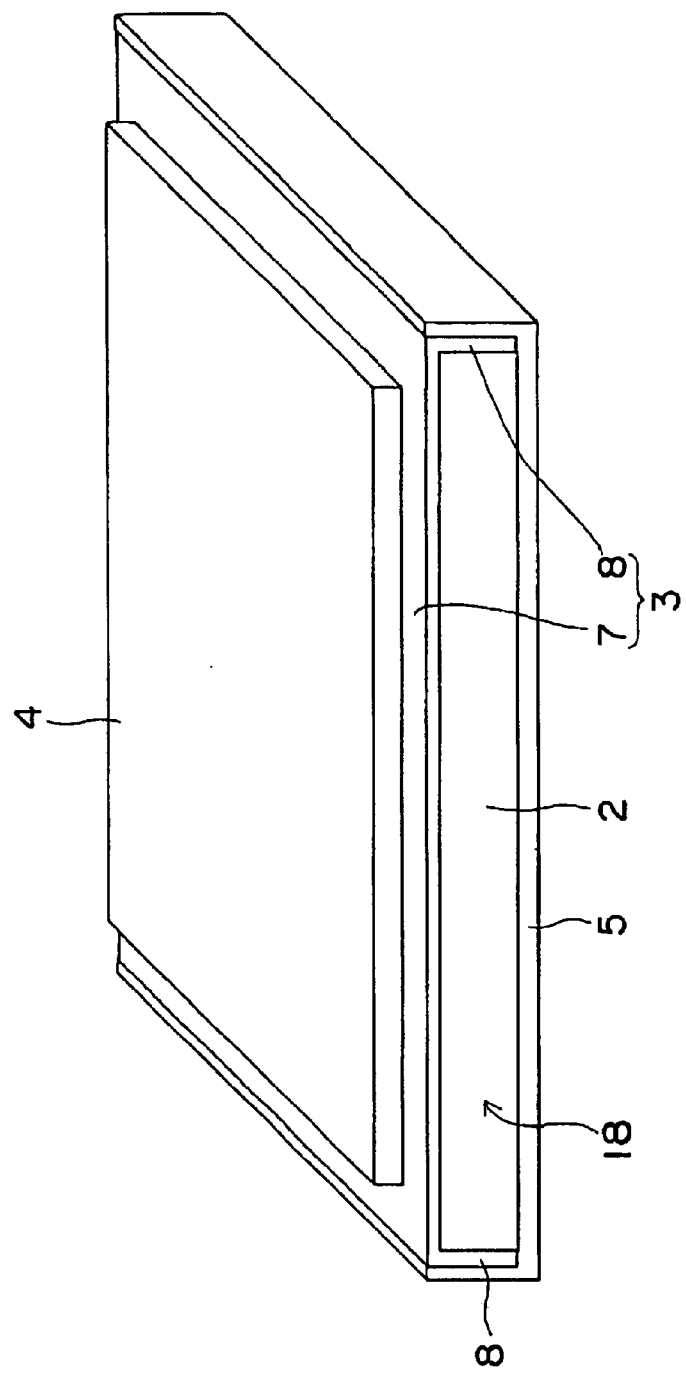
FIG. 10 is a perspective view showing another embodiment of an electrolyte film.
Figure 1:
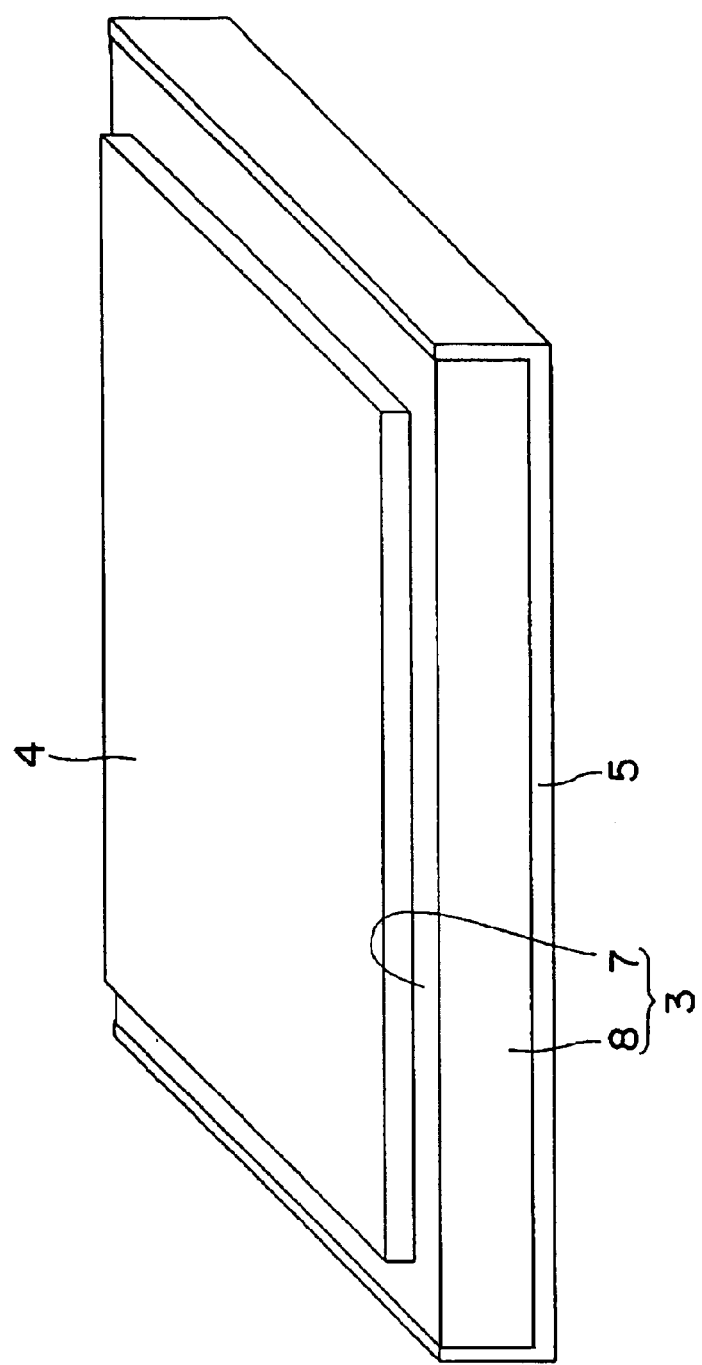

Although the seal portion 8 of the electrolyte film 3 is composed of the edge film portion 8a and the corner film portion 8b in this embodiment, the present invention is not restricted thereto and, for example, only the seal portion 8a which covers the edge portion of the electrolyte portion 7 may be formed without forming the corner film portion 8a for partitioning the gas inflow/outflow opening 18 as shown in FIG. 10. In this case, the seal portion 8a may be formed on the entire side surfaces of the porous fuel electrode substrate 2 as shown in the drawing, and the entire edge portions of the side surfaces close to the electrolyte portion 7 may be covered as similar to the edge film portion 8a shown in FIG. 2.

Further, although the spacer used for forming the laminated body 10 is the porous substrate in this embodiment, the present invention is not restricted thereto and, for example, a spacer having a conventionally used ribs may be utilized. In this case, since the fuel gas is likewise passed through to the inside of the porous fuel electrode substrate 2, a contact area between the electrode member and the gas per unit capacity can be enlarged.

Furthermore, although both the porous fuel electrode substrate 2 and the porous air electrode substrate 4 are rectangular in this embodiment, the present invention is not restricted thereto, and a circular shape or a polygonal shape such as a triangle shape, a pentagonal shape or other shapes with more angles may be used.

What is claimed is:

1. A single cell of a flat plate type solid oxide fuel cell comprising: a first electrode member consisting of a porous substrate through which a fuel gas or air can fully pass; an electrolyte film formed on either a front surface or a back surface of said first electrode member; a second electrode member formed on said electrolyte film; and a separator film formed on the other surface of said first electrode member, wherein said first electrode member is one of a fuel electrode and an air electrode, and said second electrode member is the other one of said fuel electrode and said air electrode, and said first electrode member itself is used as a gas flow path, both front and back surfaces of said first electrode member are covered with said electrolyte film and said separator film respectively; at least one of a part of said electrolyte film and a part of said separator film has a seal portion which covers a part of side surfaces between said electrolyte film and said separator film of said first electrode member and functions as a gas seal film, said seal portion including a side film portion and a corner film portion, said side film portion covers each entire area of side surfaces of one of two pairs of opposed side surfaces of said first electrode member and seals said covered side surfaces to prevent a gas from escaping, said corner film portion covers a corner portion of each end portion of the other pair of opposed side surfaces of said first electrode member, and a part between these corner film portions is defined as a gas inflow/outflow opening.

2. A single cell of a flat plate type solid oxide fuel cell according to claim 1, wherein at least one of said electrolyte film and said separator film is formed by a wet process relative to said first electrode member.

3. A cell stack of a flat plate type solid oxide fuel cell comprising a laminated body constituted by laminating single cells defined in claim 1 in series and including a laminated body having a conductive spacer provided between said single cells adjacent to each other in a lamination direction.

4. A cell stack of a flat plate type solid oxide fuel cell according to claim 3, wherein said spacer is a porous substrate through which a fuel gas or air can fully pass.

5. A cell stack of a flat plate type solid oxide fuel cell according to claim 4, wherein said porous substrate consists of a material which is the same as that of said second electrode member.

6. A cell stack of a flat plate type solid oxide fuel cell according to claim 3, wherein a conductive jointing material is provided between said spacer and said separator film opposed to each other in said single cells which are adjacent to each other.

7. A cell stack of a flat plate type solid oxide fuel cell according to claim 3, wherein manifold plates formed of ceramics are attached on side surfaces of said laminated body, and a fuel gas and air are supplied/exhausted via a fuel gas flow opening and an air flow opening, both openings are provided to said nanifold plates.

8. A cell stack of a flat plate type solid oxide fuel cell according to claim 7, wherein said ceramics is free-cutting glass ceramics, and a fuel gas and air are supplied/exhausted via said fuel gas flow opening and said air flow opening provided to said manifold plates, both openings are bored after assembly of a cell stack.

9. A cell stack of a flat plate type solid oxide fuel cell according to claim 8, wherein entire area of side surfaces of said first electrode member of said laminated body is covered with said seal portion when assembled as a cell stack, and said gas inflow/outflow opening is formed when said fuel gas flow opening and said air flow opening are bored in said manifold plates formed of said free-cutting glass ceramics.

10. A cell stack of a flat plate type solid oxide fuel cell according to claim 3, wherein a lamination direction of said laminated body is set in a horizontal direction, each component of said laminated body is vertically arranged, and a fuel gas and air flow in a vertical direction.

* * * * *